United States Patent [19]

Kirman et al.

[11] Patent Number: 4,863,612

[45] Date of Patent: Sep. 5, 1989

[54] APPARATUS AND METHOD FOR RECOVERING MATERIALS FROM PROCESS BATHS

[75] Inventors: Lyle E. Kirman, Cleveland Heights; Kenneth C. Seufer, Jr., Middlefield, both of Ohio

[73] Assignee: Kinetico, Inc., Newbury, Ohio

[21] Appl. No.: 83,721

[22] Filed: Aug. 10, 1987

[51] Int. Cl.$^4$ .............................................. C02F 1/42
[52] U.S. Cl. ............................... 210/662; 75/101 BE; 210/670; 210/685; 210/96.1; 210/98; 210/269; 210/284; 423/DIG. 14
[58] Field of Search ............... 210/662, 670, 684, 685, 210/96.1, 98, 269, 284; 75/101 BE; 423/DIG. 14

[56] References Cited

U.S. PATENT DOCUMENTS

| | | |
|---|---|---|
| 2,938,868 | 5/1960 | Carlson et al. ...................... 210/662 |
| 3,033,641 | 5/1962 | Thomas ..................................... 23/1 |
| 3,509,998 | 5/1970 | Pellett et al. .......................... 210/98 |
| 3,985,648 | 10/1976 | Casolo ................................... 210/27 |
| 4,009,101 | 2/1977 | Hayashi .......................... 75/101 BE |
| 4,049,772 | 9/1977 | Takada et al. ........................ 423/54 |
| 4,137,290 | 1/1979 | Degenkolb et al. ..................... 423/1 |
| 4,145,281 | 3/1979 | Weishaar et al. ...................... 423/54 |
| 4,186,174 | 1/1980 | Hunter et al. ......................... 423/54 |
| 4,197,167 | 4/1980 | Wright ................................... 204/40 |
| 4,321,144 | 3/1982 | Huber .................................. 210/685 |
| 4,517,096 | 5/1985 | Sekine et al. ........................ 210/668 |
| 4,528,101 | 7/1985 | Burke et al. .......................... 210/677 |

OTHER PUBLICATIONS

"Nickel Salt Recovery System", Eco-Tec Product Bulletin.
Calmon et al., *Ion Exchange for Pollution Control*, CRC Press, 1979, pp. 173-189.
EPA Document No. 440/1-78/085, Feb. 1978, pp. 206-214.
"Control and Treatment Technology for the Metal Finishing Industry", EPA Summary Report, 1979, pp. 37-45.
"Amber-Hi-Lites", No. 102, Nov. 1967.
"Amber-Hi-Lites", No. 104, Mar. 1968.
Amber-Hi-Lites, No. 105, May 1968.
Amber-Hi-Lites, No. 162, 1979.
"Amberlite ® is the Answer" Product Brochure, Apr. 1978.

*Primary Examiner*—Ivars Cintins
*Attorney, Agent, or Firm*—Watts, Hoffmann, Fisher & Heinke Co.

[57] ABSTRACT

A method and apparatus for selectively recovering ions from an aqueous solution and producing deionized water for reuse. When used in a nickel plating process, a rinse water stream is passed through a first cation removing assembly that contains an ion exchange media having a greater affinity for nickel ions than for most or all other ions present in the system. Rinse water processed by the first cation removing assembly is conveyed to a second cation removing assembly and then to an anion removing assembly so that deionized water is produced and is then returned to a rinse bath. Rinse water is passed through the first ion exchange media until substantially all of the ion exchange sites hold a nickel ion. The other cations in the rinse water are captured by the second cation assembly. The first cation assembly is regenerated using a regeneration solution compatible with the plating bath. The regeneration solution after passing through the first cation assembly releases the captured metal ions and the regeneration solution along with the plating ions is returned to the plating bath.

14 Claims, 2 Drawing Sheets

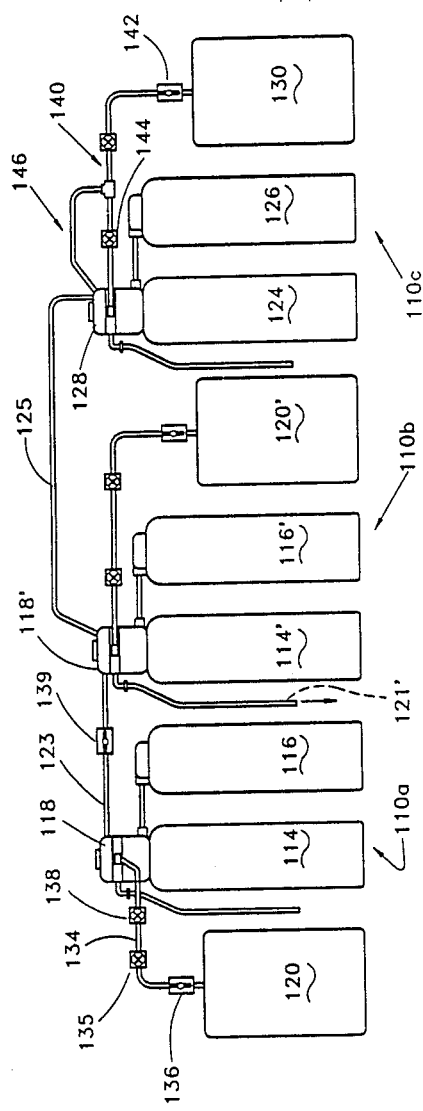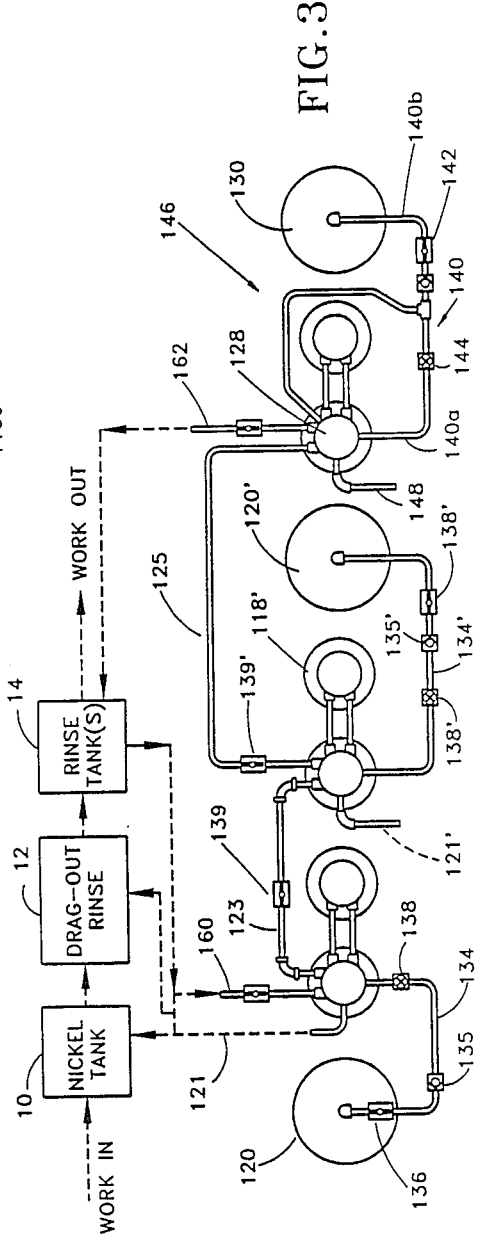

APPARATUS AND METHOD FOR RECOVERING MATERIALS FROM PROCESS BATHS

TECHNICAL FIELD

The present invention relates generally to fluid processing and in particular to an apparatus and method for recovering process materials from process solutions such as used in metal plating operations.

BACKGROUND ART

The selective recovery of specific materials from chemical solutions is a problem addressed in various ways depending on the application or process involved. In the case of plating processes, it is desirable to, at the very least, remove metal ions from the various rinse waters that are carried from the plating tank or tanks by the product being plated. Environmental concerns mandate that potentially harmful materials be removed from the effluent of these processes prior to discharge as waste. It is also desirable to recover and reuse the metal ions themselves for return to the plating tank. In this way material is conserved while at the same time preventing these materials from being discharged into the environment.

Methods and apparatus for removing or recovering metal ions from rinse baths have been suggested in the past. In one suggested application, the rinse water is passed through an ion exchange resin which captures the metal ions. During a "regeneration process", the ion exchange resin releases captured ions and the regeneration solution along with the released ions is conveyed to the metal plating bath. Unfortunately, in many if not most methods, the ion exchange resin captures all the ions having a common polarity. In the case of a nickel plating process, an ion exchange vessel designed to capture nickel ions will also capture various alkali metal ions and alkaline earth metals such as sodium, potassium, calcium and magnesium. When the resin is regenerated, the solution including all of the desirable (nickel) and undesirable (sodium, potassium, calcium, magnesium) ions are returned to the metal plating bath. Consequently, the overall contamination level (caused by the presence of the alkaline metal ions) increases in the tank. Eventually, the plating solution may require added purification steps or be partially or completely replaced in order to lower the concentration of contaminants.

In an effort to obviate this problem, it has been suggested that the regeneration solution containing the ions be further processed by other methods and apparatus in order to selectively recover the desired metal ion. This extra processing and additional apparatus increases the overall costs of the plating operation and is considered unacceptable by many metal plating operators.

DISCLOSURE OF INVENTION

The present invention provides a new and improved apparatus and method for recovering selected ions from a chemical bath. In the disclosed embodiment, the invention will be described in connection with the recovery of metal ions such as nickel from rinse water in a metal plating process. It should be understood that the principles of the present invention can be applied to processes wholly unrelated to plating, in which selected ions are to be recovered and returned to a chemical tank or reservoir containing a solution of the selected ions.

According to the broad aspect of the invention, a pair of serially connected ion exchange beds are utilized to selectively recover ions of common polarity. When applied to a nickel plating line, rinse water containing various cations and anions including nickel ions (carried into the rinse bath by the products being plated), is processed so that all of the ions (cations and anions) are removed and the resulting deionized water is returned to the rinse tank. In the disclosed and illustrated embodiment, not only are the plating ions recovered, but substantially all of the other ions are removed and discharged producing deionized water which is returned to the rinse bath for reuse. In short, both plating ions and water is conserved by the disclosed process.

By way of example, in the case of a nickel plating line, rinse water from one or more rinse tanks is conveyed to serially connected first and second cation tanks (nickel is a cation). At least the first tank contains an ion exchange media having a greater affinity for nickel ions than for most or all of the other cations present in the rinse water such as sodium, calcium, potassium and/or magnesium.

When the first cation tank is initially placed on line after being regenerated, the ion exchange sites in the ion exchange material will capture both the nickel ions as well as the other undesirable cations. Once substantially all the ion exchange sites are filled however, the nickel ions begin replacing the other previously captured, non-nickel ions (sodium, magnesium, etc.) since the ion exchange media has a greater affinity for nickel. These displaced ions then flow to the second cation tank where they are captured by the ion exchange media there. When substantially all of the ion exchange sites in the first cation tank hold a nickel ion, the first tank is regenerated using a regeneration solution compatible with the solution in the nickel plating tank. The regeneration solution releases the nickel ions as it passes through the cation tank. The regeneration solution including the released nickel ions is discharged by the first cation tank and is directed to the nickel plating tank.

The second cation tank may be regenerated concurrently with the first tank or alternately can be regenerated when all of its exchange sites are filled with ions.

According to the preferred and illustrated embodiment, the rinse water discharged by the second cation tank which now contains only oppositely charged ions or anions (decationized water), is then passed through an anion tank. The resulting water is highly purified, deionized water which is then returned to the rinse tank or tanks. It can also be used as make-up water for the plating tank.

With the disclosed method and apparatus, only a concentrated solution of nickel ions is returned to the plating bath and as a result, the contamination level in the plating bath does not increase with time, since the other undesirable ions are separately discharged. Because only purified, deionized water is returned to the rinse bath, the contamination of the rinse bath does not increase with time as well.

By carefully controlling and optimizing the plating process, the regeneration intervals of the various tanks can be a function of the volume of rinse water passed through the cation and anion tanks. A control valve assembly such as that shown in U.S. Pat. Nos. 3,891,552; 4,298,025 and/or 4,427,549 which are all owned by the present assignee, can be used in these applications for controlling the regeneration frequency of the cation and anion tanks. However, for processes in which optimum control cannot be achieved, sensors can be used in order to determine when the cation and/or anion tanks require regeneration. For example, in a nickel plating process, a monitor positioned between the two serially connected cation tanks, can detect directly or indirectly the presence of nickel ions in the stream leaving the first cation tank. The detection of nickel ions is an indication that all of the ion exchange sites in the first tank hold nickel ions and it is time for regeneration. With the preferred control system, a highly pure, concentrated solution of nickel ions is insured when the first cation tank is regenerated.

It should be understood that the disclosed method and apparatus can be used in any process where the selective recovery of a metal ion is desirable. It is not limited to nickel plating processes and in fact can be used in virtually any metal plating process such as chromium, copper, zinc, cadmium, tin, lead, iron, etc., as well as precious metal plating such as gold, silver, rhodium, platinum, palladium, etc. It can also be used to recover metal ions from etching processes and hydrometallurgical processes.

Additional features of the invention will become apparent and a fuller understanding obtained by reading the following detailed description made in connection with the accompanying drawings.

BRIEF DESCRIPTION OF THE DRAWINGS

FIG. 2 is a side elevational view of an apparatus that may serve the function of the metal recovery and water purifying apparatus shown in FIG. 1;

FIG. 3 is a top plan view of the apparatus shown in FIG. 2; and,

BEST MODE FOR CARRYING OUT INVENTION

Figure 1:
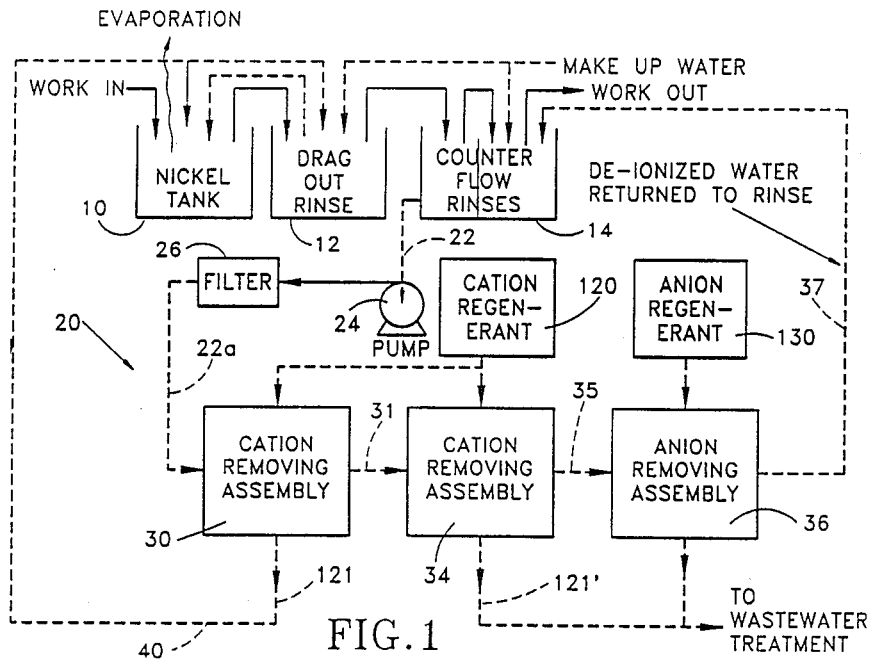
FIG. 1 schematically illustrates a plating process including a metal recovery and water purifying system constructed in accordance with the preferred embodiment of the invention.

FIG. 1 schematically illustrates a plating process including a metal recovery and water purifying system constructed in accordance with the preferred embodiment of the invention. In the illustrated embodiment, the plating line includes a conventional plating tank 10, a drag-out rinse tank 12 and a counterflow rinse tank 14. Additional rinse tanks (not shown) may also be used. The construction and operation of the tanks is conventional and does not form part of the invention. For purposes of explanation, the disclosed invention will be discussed in connection with nickel plating. It should be understood that the invention is applicable to other plating processes and in general is applicable to any process in which it is desired to selectively recover a certain ion or ions.

By way of background, work pieces to be plated are immersed in the plating tank 10 and are then transferred to the drag-out rinse tank 12. From the drag-out rinse tank 12, the plated product is transferred to one or more final rinse tanks which remove substantially all of the plating solution left on the workpiece.

It should be apparent that the work pieces leaving the plating tank 10 carry a certain amount of plating solution, most of which is left in the drag-out rinse tank 12. Over the course time, the concentration of plating ions in the drag-out rinse tank increases. As the concentration of ions in the drag-out rinse increases, more and more ions are carried into the downstream rinse tank by the work pieces In normal practice, solution lost in the plating tank due to evaporation and drag-out is at least partially replaced by transfering solution from the drag-out rinse tank 12. Typically, the concentration of metal ions in the plating tank is maintained by the addition of appropriate chemicals and/or by the use of soluble electrodes. As indicated above, the ion concentration in the final rinse tanks also increase with time. As a result, either the rinse water must be replaced or the ions removed if the product leaving the final rinse tank is to be substantially cleansed of plating solution.

In the embodiment illustrated in FIG. 1, rinse water from the rinse tank is processed by a recovery system indicated generally by the reference character 20, embodying the present invention. In the disclosed embodiment, the system continuously processes rinse water removing substantially all of the ions from the rinse water to produce deionized water which is returned to the rinse tank 14 and selectively recovers plating ions, in this case, nickel and returns a concentrated nickel solution to the drag-out rinse 12 or nickel plating tank 10 (depending on the nickel concentration of the solution).

In the disclosed embodiment, a rinse water stream 22 containing nickel and other ions typically found in rinse water is discharged from the tank 14. A pump 24 pumps the stream through a filter 26 preferably including activated carbon to remove particulate contaminants and organic impurities. A filtered stream 22a is then passed to a first cation tank assembly 30 including a tank containing a cation exchange media. In the illustrated embodiment, the lead tank is a cation removing tank because nickel is a cation. As is conventional, a media or resin in the cation tank assembly 30 captures cations in the filtered rinse water stream 22a.

Initially, the cation tank assembly 30 captures virtually all cations (other than hydrogen) including nickel, sodium, potassium, calcium and magnesium. During initial operation, a stream 31 leaving the cation assembly 30 is substantially decationized. However, the media in the cation assembly 30 is selected to have a greater affinity for the nickel ion as compared to most or all of the other cations carried in the stream 22a. As a result, when substantially all the ion sites in the ion exchange media hold a cation, further processing of rinse water will cause cations for which the resin has a lesser affinity, to be displaced by a nickel cation. Eventually, substantially all of the cation sites in the media will hold a nickel ion.

During the period of operation during which non-nickel cations are being displaced by nickel ions, the output stream 31 of the cation tank assembly 30 will, depending on the exchange media, contain sodium, potassium, calcium, and magnesium cations (if these cations are present in the rinse water). The cations discharged by the first tank assembly 30 will in turn be captured by a downstream cation tank assembly 34. A rinse water stream 35 leaving the second cation tank assembly 34 will always be decationized water as long as the ion exchange media in the second tank assembly 34 is not saturated with captured ions (other than hydrogen ions). The decationized stream 35 is then fed into an anion tank assembly 36 where substantially all of the anions are captured by the an anion exchange media contained in the anion assembly 36. As seen in FIG. 1, a stream 37 leaving the anion tank assembly 36 is highly purified, deionized water which is returned to the rinse tank 14.

When substantially all of the ion sites in the first cation tank assembly 30 hold a nickel ion, the cation media is regenerated, using a regenerating solution compatible with the plating solution in the plating tank 10. As an example, in the case of a nickel plating line, the media in the first cation tank 30 would comprise a strong acid resin that is regenerated using an acid solution The acid used would be the same as that used in the plating tank solution.

During regeneration, the acid-based regenerant is passed through the exhausted media in the tank assembly 30 and is discharged to an outlet stream indicated generally by the reference character 40. The regeneration solution stream leaving the tank assembly 30 is in fact a concentrated nickel solution which is then returned to the plating tank 10 or the drag-out rinse 12. Because the tank assembly 30 only holds nickel ions, the solution returned to the plating tank 10 (or drag-out rinse 12) is substantially free of other metal ions and organic impurities. As a result, the contamination level does not increase substantially with time.

The regeneration solution leaving the tank assembly 30 will normally be transferred to either the plating tank 10 or drag-out rinse 12 (if one is used in the plating process) depending on the concentration of the solution Generally if the concentration of nickel ions in the solution is less than the nickel concentration in the drag-out rinse, the solution is returned to the drag-out rinse to replace liquid lost to evaporation and/or carry out. Normally fluid from the drag-out rinse is used to replenish the plating solution in the plating tank 10 lost to evaporation and drag-out.

The cation tank assembly 34 is separately regenerated with the same or a different regeneration solution. The discharge from the tank assembly 34, however, is discharged to a drain or to a waste water treatment process. The same is true of the anion tank assembly 36. The anion vessel which would typically contain a base media would be regenerated with an appropriate regeneration solution The regeneration solution leaving the anion tank assembly 36 is discharged to drain or to a waste water treatment process and is ultimately disposed of.

It should be apparent that with the disclosed apparatus and process, rinse water from one or more rinse tanks is continuously processed to selectively recover plating ions for return to the plating tank while at the same time providing highly purified, deionized water for reuse by one or more rinse tanks.

FIGS. 2 and 3 illustrate the details of an apparatus capable of performing functions of the first cation assembly 30, the second cation assembly 32 and the anion assembly 36 illustrated in FIG. 1. In the illustrated apparatus, each assembly includes two resin tanks so that the fluid treatment does not have to be interrupted during regeneration. When one of the resin tanks of a tank assembly is on-line, the other tank is regenerated and maintained in a standby condition. The apparatus shown in FIGS. 2 and 3 is similar to an apparatus disclosed in U.S. Pat. No. 4,427,549 which includes a cation and anion tank arrangement for producing deionized water, and is hereby incorporated by reference.

The apparatus shown in FIG. 2 can be divided, for purposes of explanation into three sections, namely the lead cation section 30, the second cation section 34, and the anion section 36. In the preferred embodiment, both cation sections 30, 34 are substantially identical and for purposes of explanation, similar or identical parts will be designated in the downstream cation section 34 with the same reference character followed with an apostrophe ('). Since both cation sections are virtually identical, only the lead cation section will be described. The cation section 30 comprises a pair of cation tanks 114, 116, each containing cation exchange material. A control valve assembly 118 interconnects the cation tanks 114, 116 and controls the inter communication between the tanks, the communication between the tanks and the incoming rinse water to be processed, and the regeneration of an exhausted tank. The control valve assembly 118 is of the type described in U.S. Pat. No. 4,427,549.

By way of summary, the control valve assembly 118 communicates with a source of cation regeneration fluid contained in a separate vessel 120. The regeneration fluid is generally a strong acid such as sulphuric acid ($H_2SO_4$) or hydrochloric acid (HCl). The valve assembly 118 also communicates with a drain conduit indicated generally by the reference character 121. According to the invention, the drain conduit 121 of the lead cation tank section 110a is connected to the plating tank 10 so that the regenerant (including the released nickel ions) leaving either of the cation tanks 114, 116 is transferred to the plating tank 10.

Regenerating solution leaving the cation section 34 is normally discharged to waste. Depending on content of the regeneration solution discharged by the tanks 114', 116' during a regeneration cycle, the drain 121' is normally connected to a waste water treatment process.

Partially treated rinse water leaving the lead cation section 30 is conveyed to the second cation section 34 by a transfer conduit 123. In the preferred embodiment, the construction and operation of the second cation section 34 is identical to the operation and configuration of the lead cation section 30.

Depending on the application and other factors, the ion exchange resins contained in the tanks in the cation sections 30, 34 may be the same or different. For the nickel plating process shown in FIG. 1, the tanks 114, 116 of the lead cation section 30 are preferably filled with a strong acid resin such as a resin sold under the tradename IR-122 or a chelating resin such as a resin sold under the tradename IRC-718, both of which are available from Rohm and Haas Corporation of Philadelphia, Pa. The tanks 114', 116' of the second cation section 34 may contain a strong acid cation resin such as IR-122.

Decationized water leaving the second cation section 34 is conveyed to the anion section 36 by another transfer conduit 125. The anion section 36 comprises a pair of anion tanks 124, 126 each containing an anion exchange resin. In the disclosed and illustrated embodiment, the anion tanks 124, 126 are filled with a strong base resin such as a resin sold under the tradename IRA-910 also available from Rohm and Haas Corporation. An anion control valve assembly 128 interconnects the anion tanks 124, 126 and controls the intercommunication between the tanks, the communication between the tanks and the transfer conduit 125 and the regeneration of an exhausted anion tank. The anion valve assembly communicates with a source of anion regeneration fluid contained in a separate vessel 130. The regeneration fluid is typically a base chemical such as sodium hydroxide (NaOH). The anion valve assembly 128 may be the type disclosed in U.S. Pat. No. 4,427,549.

Referring also to FIG. 3, the cation regeneration fluid supply vessel 120 communicates with the cation control valve assembly 118 through a supply conduit 134 that includes a check valve 135. The check valve 135 allows fluid flow from the vessel 120 into the valve assembly 118 but prevents reverse flow. A shut-off valve 136 and metering valve 138 are preferably disposed in the line to control the flow of regeneration fluid to the valve assembly 118. The cation section 34 includes similar plumbing connections.

The transfer conduit 123 includes a hand valve 139 which provides a means for isolating the cation sections 30, 34. A hand valve 139' in the transfer conduit 125 provides a means for isolating the cation and anion sections 34, 36.

The anion section 36 includes similar plumbing components. In particular the anion regeneration fluid supply vessel 130 communicates with the anion control valve assembly 128 through a regeneration supply conduit 140 having two portions 140a, 140b. Like the cation supply conduit 134, the anion conduit includes both a hand valve and a metering valve 142, 144 for adjusting and controlling the flow of regeneration fluid to the control valve assembly 128. Spent regeneration solution is discharged from the valve assembly into a drain conduit 148. Depending on the constituents in the regeneration solution, it may be discharged from the conduit 148 into a sewer or a waste water treatment process.

In the illustrated apparatus, the anion section 36 also includes an additional fluid circuit indicated generally by the reference character 145 which provides a method for flushing residual regeneration fluid from the conduit portion 140a of the regeneration supply conduit and also provides a slow rinse function during the portion of a regeneration cycle of an anion tank The flushing circuit is described in U.S. Pat. No. 4,427,549 and forms no part of the present invention.

The apparatus operates as follows, filtered rinse water from the rinse tank 14 is introduced into the treatment apparatus 20 through an inlet conduit 160. Deionized water leaves the anion tank through an outlet conduit 162 and in the illustrated embodiment is returned to the rinse tank 14.

In normal operation, the cation control assembly 118 places one of the cation tanks 114, 116 "on line" and maintains the other tank "off-line" until the on-line tank is exhausted. The water introduced into the valve assembly 118 travels through the on-line tank, exchanging cations such as nickel, sodium, calcium, magnesium, iron, etc. for hydrogen ions held by the cation resin. When a cation tank is first placed on-line, decationized water substantially free of all cations is discharged by the tank into the transfer conduit 123. After an amount of rinse water is passed through the lead cation tank assembly 30, all of the ion sites in the resin will hold a cation. As additional water is passed through the tank assembly 30, cations for which the resin has lesser affinity, will be replaced with ions for which the resin has a greater affinity. The released cations leaving the lead cation tank assembly 30 will then travel to the second cation tank assembly 34 and be captured by the resin in that tank. If this process is continued long enough, all the ion sites in the first cation section 30 will hold the ion for which the resin has its greatest affinity In the preferred embodiment, the resin in the lead cation section 30 has a greater affinity for the nickel ion. Hence, after a sufficient amount of time, substantially all of the ion exchange sites in the resin will hold a nickel ion. The other cations such as sodium, magnesium, etc., will in turn be captured by the second cation section 34.

Once the resin is saturated with nickel ions, the cation tank is regenerated using a chemical such as sulfuric or hydrochloric acid which is compatible with the plating solution in the plating tank 10. The regeneration solution leaving the cation tank which in effect is a concentrated solution of plating ions is returned to the plating bath.

The second cation section is regenerated as needed in order to remove and dispose of the undesirable cations (such as sodium, magnesium, etc.). The regeneration solution along with the undesirable ions are ultimately discharged from the system.

Similarly, the anion section which removes anions from the decationized water leaving the second cation section 34 is regenerated as needed to remove the captured anions. When regenerated, the released anions and regeneration solution are discharged to drain or to a secondary waste water treatment process.

The deionized water leaving the anion section 36 is returned to the rinse water bath 14 or may also be used as make up water for plating baths or other baths in the system.

Figure 4:
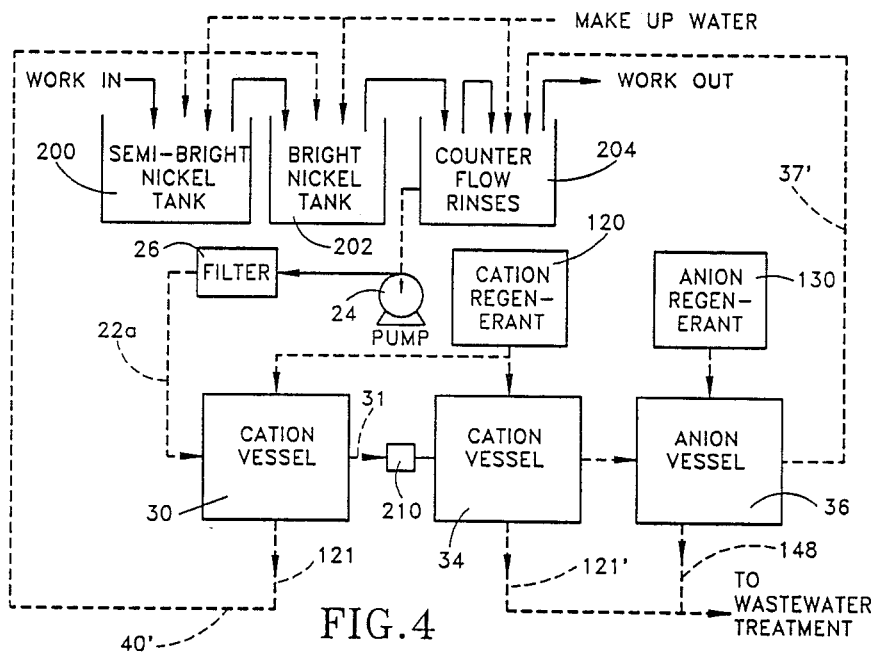
FIG. 4 is a schematic representation of another plating process including a metal recovery and water purifying system constructed in accordance with the preferred embodiment of the invention.

It should be noted here that a resin used in the cation section 30 does not necessarily have to have the greatest affinity for the nickel ion to be useful. If the ion for which it has its greatest affinity, i.e. calcium, is not considered a problem or contaminant in the system, the resin such as IR-122 can be used as long as the affinity the resin has for the ions actually present in deleterious amounts in the system is less than its affinity for nickel FIG. 4 illustrates another plating process for which the apparatus of the present invention can be used. In the process illustrated in FIG. 4, the plating occurs in both a semi-bright nickel tank 200 and a bright nickel tank 202. The plated work pieces are rinsed in one or more counterflow rinse tanks indicated by the reference character 204. Although the plating process is different from that shown in FIG. 1, the apparatus 20 for capturing nickel ions carried into the rinse water and for ultimately producing de-ionized water is the same as shown in FIG. 1. The plating process itself is conventional and is used when a bright nickel finish with enhanced corrosion resistance is desired. In the system shown in FIG. 4, however, the regeneration solution leaving the first cation removing assembly 30 is returned by a return conduit 40' to either or both nickel plating tanks 200, 202. As is known, it is critical that the semi-bright nickel tank 200 remain uncontaminated in order for the process to produce optimum corrosion resistance. The disclosed invention, when operated optimally, can produce a highly concentrated, compatible solution of nickel ions as a result of regeneration of the lead cation assembly 30. The regeneration solution is substantially free of other contaminating ions and organic additives therefore can be used to replenish the semi-bright nickel tank 200.

When the system is such that the rate of nickel plating bath carried into the rinse tank 14 is relatively constant, the frequency at which the various tanks are regenerated can be determined by the volume of rinse water processed. However, in many if not most plating processes, the ion content of the rinse water may vary considerably. And therefore the volume of rinse water processed by the lead cation tank assembly 30 may not be indicative of the amount of nickel ions captured in the lead cation assembly Therefore, in the preferred embodiment, the stream 31 leaving the first cation tank assembly is monitored. As explained above, when a lead cation tank is first placed on line, it will capture all cations that are in the rinse water stream 22a. After substantially all of the ion exchange sites hold a cation, nickel ions will replace ions for which the media has a lesser affinity. According to the invention, by monitoring, directly or indirectly, the presence of nickel ions in the stream 31, one can determine when substantially all of the ion exchange sites in the lead cation tank assembly 30 hold a nickel ion. In the preferred embodiment a probe or sensor 210 is located intermediate the first and second cation assemblies 30, 34. The probe may either detect directly, the presence of nickel ions and upon detecting a predetermined level, operates to initiate regeneration of the on line anion tank. Alternately, the probe 210 can monitor the pH of the stream 31 and upon detecting a predetermined pH level which corresponds to the presence of a predetermined level of nickel ions, operates to cause regeneration of the on line tank. Nickel ion and pH responsive probes are commercially available.

It should be noted here that the present invention is also applicable to a process for selectively recovering an anion. In an anion recovery process two serially connected anion tank assemblies would be employed. The lead anion tank would contain an ion exchange media having a greater affinity for the desired anion as compared to most or all of the other anions present in the rinse water stream. Regenerating the lead anion tank (after becoming saturated with the desired anion) will produce a concentrated solution of the desired anion which is then returned to a plating tank or other reservoir. To produce deionized water, a cation tank assembly would be placed upstream (or downstream) of the anion tank assemblies.

Although the invention has been described with a certain degree of particularity, it should be understood that those skilled in the art can make various changes to it without departing from the spirit or scope of the invention as hereinafter claimed.

What is claimed is:

1. Apparatus for selectively recovering a cation from an aqueous solution containing a plurality of cations, comprising:
    (a) a first cation removing assembly containing an ion exchange material having an affinity for the selected cation that is greater than its affinity for at least most other cations in the aqueous solution;
    (b) a second cation removing assembly;
    (c) conduit means for delivering processed aqueous solution from said first cation removing assembly to said second cation removing assembly;
    (d) an anion removing assembly operative to remove anions from said aqueous solution;
    (e) means or determining the presence of said selected cation in an output stream discharged by said first cation removing assembly; and
    (f) means or regenerating said first cation removing assembly upon determining that a predetermined amount of said selected cation is present in said output stream and conveying a regeneration solution containing said selected cation to a reservoir for holding a solution of said selected cation.

2. The apparatus of claim 1 wherein said means is a plating bath.

3. The apparatus of claim 1 wherein said means for determining the presence of said selected cation in said output stream is an apparatus for monitoring the pH of said stream.

4. The apparatus of claim 1 wherein said means for determining the presence of said selected cation comprises a probe that is directly responsive to the presence of a selected cation in the output stream.

5. The apparatus of claim 1 wherein said means for determining the presence of said selected cation comprises a fluid volume monitoring device.

6. A method for recovering a selected cations, comprising the steps of:
    (a) conveying said solution through a first cation exchange media, said media having a greater affinity for said selected cation than for most other cations present in the aqueous solution;
    (b) conveying an output solution from said first cation exchange media to a second cation exchange media in order to capture cations released by said first cation exchange media;
    (c) passing an output stream from said second cation exchange media to an anion exchange media to remove substantially all anions carried in said solution to produce de-ionized water at the output of an anion removing assembly;
    (d) passing said aqueous solution through said first cation exchange media until substantially all of the ion exchange sites in said media hold the selected cation; and
    (e) determining a level of said selected cation in the output solution from said first cation exchange media and upon determining a predetermined level of said selected cation, regenerating said first cation exchange media and conveying a regeneration solution including the selected cations from said first cation media to a reservoir for said selected cations.

7. The method of claim 6 wherein said step for determining a predetermined level of said selected cation is achieved by monitoring the pH of said output solution.

8. The method of claim 6 wherein said step of determining a predetermined level of said selected cation is achieved by monitoring the quantity of aqueous solution conveyed through said first cation exchange media.

9. The method of claim 6 wherein said step of determining a predetermined level of said selective cation is achieved by directly monitoring the presence of said selected cation in said output solution.

10. A method for recovering plating ion in a metal plating process, comprising the steps of:
    (a) providing a plating bath having plating ions in solution to be plated onto a work piece;
    (b) providing a rinse bath into which work pieces are immersed in order to remove residual plating solution carried by a work piece leaving the plating bath;
    (c) conveying a stream of rinse water from said rinse bath through a first ion exchange assembly that is selected to have an affinity for said plating ions that is greater than its affinity for most other ion in said rinse water stream having the same polarity as said plating ion;
    (d) conveying an output stream from said first ion exchange assembly to another ion exchange assembly in order to remove substantially all of said other ions and ions having an opposite polarity from said plating and other ions carried in said output stream to produce deionized water;

(e) continuing to convey said rinse water stream through said first ion exchange assembly until substantially all of its ion exchange sites hold a plating ion;

(f) determining that substantially all of the ion exchange sites in said first ion exchange assembly hold a plating ion and upon determining that substantially all of the ion exchange sites in said first ion exchange assembly hold a plating ion, regenerating said first ion exchange assembly and conveying a regeneration solution passed through said first ion exchange assembly to an ion solution reservoir whereby said plating ions are recovered; and (g) conveying the deionized water from said other ion exchange assembly to said rinse bath.

11. The method of claim 10 wherein said first ion exchange assembly includes a cation removing exchange media and said another ion exchange assembly includes a cation removing medial and an anion removing media.

12. The method of claim 10 wherein said step for determining when said ion exchange sites in said first ion exchange assembly each hold a plating ion, is achieved by monitoring the pH of the fluid stream leaving said first ion exchange assembly.

13. Apparatus for selectively recovering an anion from an aqueous solution containing a plurality of anions, comprising:

(a) an anion removing assembly containing an ion exchange material having an affinity for the selected anion that is greater than its affinity for at least most other anions in the aqueous solution;

(b) a second anion removing assembly;

(c) conduit means for delivering processed aqueous solution from said first anion removing assembly to said second anion removing assembly;

(d) a cation removing assembly operative to remove cations from said aqueous solution;

(e) means for determining the presence of said selected anion in an output stream discharged by said first anion removing assembly; and (f) means for regenerating said first anion removing assembly upon determining that a predetermined amount of said selected anion is present in said output stream and conveying a regeneration solution containing said selected anion to a reservoir for holding a solution of said selected anion.

14. A method for recovering a selected anion from an aqueous solution containing a plurality of anions, comprising the steps of:

(a) conveying said solution through a first anion exchange media, said media having a greater affinity for said selected anion than for most other anion present in the aqueous solution;

(b) conveying an output solution from said first anion exchange media to a second anion exchange media in order to capture anions released by said first anion exchange media;

(c) passing an output stream from said second anion exchange media to a cation exchange media to remove substantially all cations carried in said solution to produce de-ionized water at the output of a cation removing assembly;

(d) passing said aqueous solution through said first anion exchange media until substantially all of the ion exchange sites in said media hold the selected anion; and (e) determining a predetermined level of said selected anion in the output solution from said first anion exchange media and upon determining said predetermined level of said selected anion regenerating said first anion exchange media and conveying a regeneration solution including the selected anions from said first anion exchange media to a reservoir for said selected anions.

* * * * *

UNITED STATES PATENT OFFICE
CERTIFICATE OF CORRECTION

Patent No. 4,863,612                    Dated September 5, 1989

Inventor(s)  Kenneth C. Seuffer, et al.

It is certified that error appears in the above-identified patent and that said Letters Patent is hereby corrected as shown below:

Column 5, line 27, after solution, add -- . --;
Column 8, line 32, after nickel, add -- . --;
Column 10, line 10, after selected, add -- cation from an aqueous solution containing a plurality of --;
Column 10, line 60, after plating, change "ion" to -- ions --;
Column 12, line 15, after other, change "anion" to -- anions --.

Signed and Sealed this

Twenty-eighth Day of August, 1990

Attest:

HARRY F. MANBECK, JR.

*Attesting Officer*              *Commissioner of Patents and Trademarks*

REEXAMINATION CERTIFICATE (2418th)
United States Patent [19]
Kirman et al.

[11] B1 4,863,612
[45] Certificate Issued Nov. 1, 1994

[54] APPARATUS AND METHOD FOR RECOVERING MATERIALS FROM PROCESS BATHS

[75] Inventors: Lyle E. Kirman, Cleveland Heights; Kenneth C. Seufer, Jr., Middlefield, both of Ohio

[73] Assignee: Kinetico, Inc., Newbury, Ohio

Reexamination Request:
No. 90/002,765, Jun. 18, 1992

Reexamination Certificate for:
Patent No.: 4,863,612
Issued: Sep. 5, 1989
Appl. No.: 83,721
Filed: Aug. 10, 1987

Certificate of Correction issued Aug. 28, 1990.

[51] Int. Cl.$^5$ ............................................. C02F 1/42
[52] U.S. Cl. ................................. 210/662; 210/670; 210/685; 210/96.1; 210/98; 210/269; 210/284; 423/DIG. 14; 423/139
[58] Field of Search .............. 210/662, 670, 684, 685, 210/96.1, 98, 269, 284; 423/DIG. 14, 139

[56] References Cited

U.S. PATENT DOCUMENTS

| | | | |
|---|---|---|---|
| 4,049,772 | 9/1977 | Takada et al. | 423/54 |
| 4,137,290 | 1/1979 | Degenholb et al. | 423/1 |

OTHER PUBLICATIONS

Diamond Shamrock Duolite Ion Exchange Resins brochure.
Exerpt from Centec Corporation brochure entitle "The Application of Separation Process In The Metal Finishing Industry", pp. 23–29.
Paper entitled "Second Conference On Advanced Pollution Control For The Metal Finishing Industry" written by U.S. Environmental Protection Agency, May, 1979, pp. 8–10.
Paper entitled "Third Conference On Advanced Pollution Control For The Metal Finishing Industry", written by U.S. Environmental Protection Agency, Feb., 1981, pp. 85–87.

*Primary Examiner*—Ivars C. Cintins

[57] ABSTRACT

A method and apparatus for selectively recovering ions from an aqueous solution and producing deionized water for reuse. When used in a nickel plating process, a rinse water stream is passed through a first cation removing assembly that contains an ion exchange media having a greater affinity for nickel ions than for most or all other ions present in the system. Rinse water processed by the first cation removing assembly is conveyed to a second cation removing assembly and then to an anion removing assembly so that deionized water is produced and is then returned to a rinse bath. Rinse water is passed through the first ion exchange media until substantially all of the ion exchange sites hold a nickel ion. The other cations in the rinse water are captured by the second cation assembly. The first cation assembly is regenerated using a regeneration solution compatible with the plating bath. The regeneration solution after passing through the first cation assembly releases the captured metal ions and the regeneration solution along with the plating ions is returned to the plating bath.

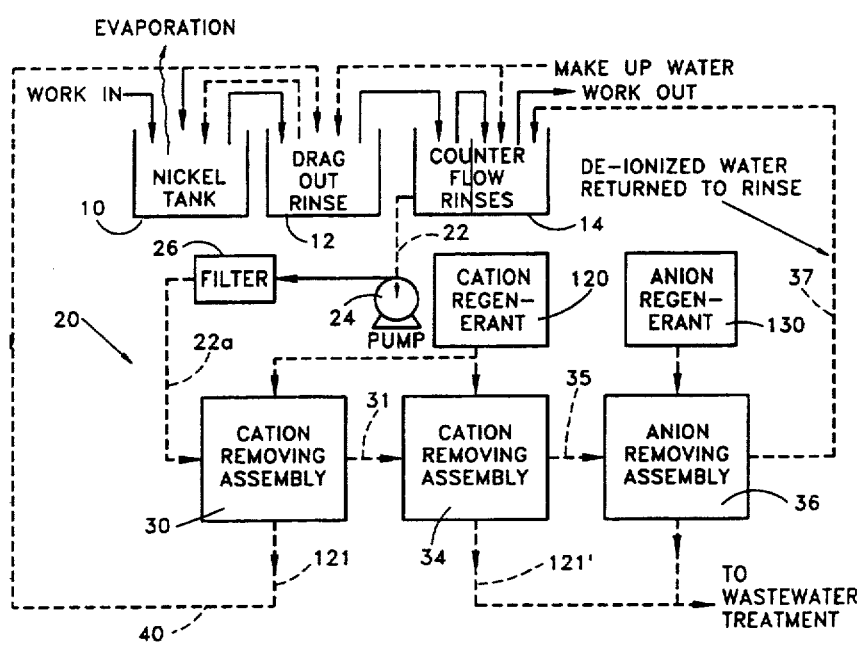

REEXAMINATION CERTIFICATE ISSUED UNDER 35 U.S.C. 307

THE PATENT IS HEREBY AMENDED AS INDICATED BELOW.

Matter enclosed in heavy bracket [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 6, 10, 13 and 14 are determined to be patentable as amended.

Claims 3-5, 7-9, 11 and 12, dependent on an amended claim, are determined to be patentable.

1. Apparatus for [selectively] recovering a *selected* cation from an aqueous solution containing a plurality of cations, comprising:
   a) a first cation removing assembly containing an ion exchange material having an affinity for the selected cation that is greater than its affinity for at least most other cations in the aqueous solution;
   b) a second cation removing assembly *containing an ion exchange material capable of capturing substantially all cations present in a processed aqueous solution discharged by said first cation assembly to thereby produce decationized water;*
   c) *first* conduit means for delivering *said* processed aqueous solution from said first cation removing assembly to said second cation removing assembly;
   d) *second conduit means for delivering decationized water from said second cation removing assembly to* an anion removing assembly, *said anion removing assembly* operative to remove anions from said *decationized water* [aqueous solution] *to produce deionized water;*
   e) means for determining the presence of said selected cation in an output stream discharged by said first cation removing assembly; [and]
   f) means for regenerating said first cation removing assembly upon determining that [a predetermined amount of] said selected cation is present in said output stream and conveying a regeneration solution containing said selected cation to a reservoir for holding a solution of said selected cation; *and,*
   g) *means for separately regenerating said second cation removing assembly and said anion removing assembly, including means for discharging regeneration solutions containing waste cations and waste anions to a waste discharge means.*

2. The apparatus of claim 1 wherein said [means] *reservoir* is a plating bath.

6. A method for recovering a selected cation from an aqueous solution containing a plurality of cations, comprising the steps of:
   a) conveying said solution through a first cation exchange media, said media having a greater affinity for said selected cation than for most other cations present in the aqueous solution;
   b) conveying an output solution from said first cation exchange media to a second cation exchange media in order to capture *substantially all* cations released by said first cation exchange media *in order to produce decationized water;*
   c) passing *said decationized water* [an output stream] from said second cation exchange media to an anion exchange media to remove substantially all anions carried in said solution to produce de-ionized water at the output of an anion removing assembly;
   d) passing said aqueous solution through said first cation exchange media until substantially all of the ion exchange sites in said media hold the selected cation; [and]
   e) determining a level of said selected cation in the output solution from said first cation exchange media and upon determining a predetermined level of said selected cation, regenerating said first cation exchange media and conveying a regeneration solution including the selected cations from said first cation media to a reservoir for said selected cations; *and,*
   f) *separately regenerating said second cation exchange media and said anion exchange media and conveying regeneration solutions from said second cation exchange media and said anion exchange media to a waste discharge means.*

10. A method for recovering plating ions in a metal plating process, comprising the steps of:
   a) providing a plating bath having plating ions in solution to be plated onto a work piece;
   b) providing a rinse bath into which work pieces are immersed in order to remove residual plating solution carried by a work piece leaving the plating bath;
   c) conveying a stream of rinse water from said rinse bath through a first ion exchange assembly that is selected to have an affinity for said plating ions that is greater than its affinity for most other ions in said rinse water stream having the same polarity as said plating ion;
   d) conveying an output stream from said first ion exchange assembly to another ion exchange assembvly in order to remove substantially all of said other ions and ions having an opposite polarity from said plating and other ions carried in said output stream to produce deionized water;
   e) continuing to convey said rinse water stream through said first ion exchange assembly until substantially all of its ion exchange sites hold a plating ion;
   f) determining that substantially all of the ion exchange sites in said first ion exchange assembly hold a plating ion and upon determining that substantially all of the ion exchange sites in said first ion exchange assembly hold a plating ion, regenerating said first ion exchange assembly and conveying a regeneration solution passed through said first ion exchange assembly to an ion solution reservoir whereby said plating ions are recovered; [and]
   g) conveying the deionized water from said other ion exchange assembly to said rinse bath; *and,*
   h) *separately regenerating said other ion exchange assembly and conveying regeneration solution from said other ion exchange assembly to a waste discharge means.*

13. Apparatus for [selectively] recovering *a selected* [an] anion from an aqueous solution containing a plurality of anions, comprising:

a) an anion removing assembly containing an ion exchange material having an affinity for the selected anion that is greater than its affinity for at least most other anions in the aqueous solution;

b) a second anion removing assembly *containing an ion exchange material capable of capturing substantially all anions present in a processed aqueous solution discharged by said first anion assembly to thereby produce deanionized water;* c) *first* conduit means for delivering processed aqueous solution from said first anion removing assembly to said second anion removing assembly;

d) *second conduit means for delivering deanionized water from said second anion removing assembly to a* cation removing assembly, *said cation removing assembly* operative to remove cations from said *deanionized water to produce deionized water* [aqueous solution];

e) means for determining the presence of said selected anion in an output stream discharged by said first anion removing assembly; [and]

f) means for regenerating said first anion removing assembly upon determining that a predetermined amount of said selected anion is present in said output stream and conveying a regeneration solution containing said selected anion to a reservoir for holding a solution of said selected anion; *and,* g) *means for separately regenerating said second anion removing assembly and said cation removing assembly, including means for discharging regeneration solutions containing waste anions and waste cations to a waste discharge means.*

14. A method for recovering a selected anion from an aqueous solution containing a plurality of anions, comprising the steps of:

a) conveying said solution through a first anion exchange media, said media having a greater affinity for said selected anion than for most other anions present in the aqueous solution;

b) conveying an output solution from said first anion exchange media to a second anion exchange media in order to capture anions released by said first anion exchange media *in order to produce deanionized waater;* c) passing *said deanionized water* [an output stream] from said second anion exchange media to a cation exchange media to remove substantially all cations carried in said solution to produce de-ionized water at the output of a cation removing assembly;

d) passing said aqueous solution through said first anion exchange media until substantially all of the ion exchange sites in said media hold the selected anion; [and]

e) determining a predetermined level of said selected anion in the output solution from said first anion exchange media and upon determining said predetermined level of said selected anion regenerating said first anion exchange media and conveying a regeneration solution including the selected anions from said first anion exchange media to a reservoir for said selected anions; *and,* f) *separately regenerating said second anion exchange media and said cation exchange media and conveying regeneration solutions from said second anion exchange media and said cation exchange media to a waste discharge means.*

* * * * *